United States Patent
Skubch (10) Patent No.: US 10,800,042 B2
(45) Date of Patent: Oct. 13, 2020

(54) EXECUTING CENTRALIZED AND DECENTRALIZED CONTROLLED PLANS COLLABORATIVELY BY AUTONOMOUS ROBOTS

(71) Applicant: Rapyuta Robotics Co., Ltd, Tokyo (JP)

(72) Inventor: Hendrik Skubch, Tokyo (JP)

(73) Assignee: RAPYUTA ROBOTICS CO., LTD., Tokyo (JP)

( * ) Notice: Subject to any disclaimer, the term of this patent is extended or adjusted under 35 U.S.C. 154(b) by 0 days.

(21) Appl. No.: 16/363,840

(22) Filed: Mar. 25, 2019

(65) Prior Publication Data
US 2020/0016754 A1    Jan. 16, 2020

Related U.S. Application Data
(60) Provisional application No. 62/696,960, filed on Jul. 12, 2018.

(51) Int. Cl.
*G06F 9/50* (2006.01)
*B25J 9/16* (2006.01)

(52) U.S. Cl.
CPC .......... *B25J 9/1682* (2013.01); *B25J 9/1653* (2013.01); *B25J 9/1661* (2013.01)

(58) Field of Classification Search
CPC ..... B25J 9/1643; B25J 9/1676; G05D 1/0088; G05D 1/104; G08G 5/0069; G08G 5/003; G08G 5/0034; G08G 5/0043
USPC ..... 700/245, 248, 33; 318/587, 628, 568.11; 705/7.38, 7.39; 718/100, 104; 901/1, 9
See application file for complete search history.

(56) References Cited

U.S. PATENT DOCUMENTS

| | | | | |
|---|---|---|---|---|
| 9,637,310 B1* | 5/2017 | Zou | ..... | G05D 1/0297 |
| 2004/0073337 A1* | 4/2004 | McKee | ..... | G05D 1/0251 700/245 |
| 2009/0254217 A1* | 10/2009 | Pack | ..... | G06N 3/008 700/246 |
| 2012/0180064 A1* | 7/2012 | Helander | ..... | G06F 9/4887 718/104 |
| 2015/0284010 A1* | 10/2015 | Beardsley | ..... | B60W 50/10 701/41 |

* cited by examiner

Primary Examiner — Dalena Tran
(74) Attorney, Agent, or Firm — Trupti P. Joshi (57) ABSTRACT

A system and method to control execution of a centralized and decentralized controlled plan, has been described. A plan execution engine executing at a cloud node, receives sensor data captured by one or more sensors at a plurality of autonomous robots and a plan execution status of the centralized controlled plan. The plan execution engine executing at the cloud node, determines whether the plurality of autonomous robots satisfy a transition condition. Next a determination is made one or more activated constraints and task allocation for one or more autonomous robots in the next state. Next the plan execution engine executing at the cloud node and autonomous robots collaboratively determine a constraint solution for the activated one or more plan constraints. Finally based on the determined constraint solution, the one or more plan execution engines sends instructions to an actuator for executing the task included in the centralized controlled plan.

20 Claims, 8 Drawing Sheets

EXECUTING CENTRALIZED AND DECENTRALIZED CONTROLLED PLANS COLLABORATIVELY BY AUTONOMOUS ROBOTS

CROSS REFERENCE TO RELATED APPLICATION

This patent application claims the benefit of U.S. Provisional Patent Application Ser. No. 62/696,960 titled "Alica cloud nodes" filed on Jul. 12, 2018 that is incorporated by reference herein.

TECHNICAL FIELD

This invention is generally related to the field of plan execution by autonomous robots and more particularly related to centralized and decentralized controlled plan execution by autonomous robots.

BACKGROUND

Robots have been at the cornerstone of automating mechanical tasks. Currently robots are being used to automate tasks in almost every field, for example, farming, warehouse automation, military, etc.

While current robots are able to individually execute a simple plan, controlling complex plan execution requires multiple robots to collaborate with each other. There are several challenges for controlling robots that execute a plan in collaboration. For example, controlling plan execution by multiple robots require execution of several process-intensive tasks, such as determining task assignment to multiple robots, synchronizing task execution between robots, etc. With the limited processing power available at a single robot it is difficult for a single robot to control execution of these process-intensive tasks.

Further due to fast changing environment during a collaborative activity the results of these process intensive tasks have to be determined at the shortest possible time as result for a particular process intensive task may become redundant after a particular time lapse.

Additionally, complex plan execution may also include execution of several interdependent tasks by multiple robots. Controlling execution of the interdependent tasks require controlling the execution flow of each of the tasks between multiple robots, which is currently not possible.

Further, a user planning the complex plan execution also requires the flexibility of deciding ways in which plan execution is controlled. Therefore, there is a need to provide a solution that address time and high processing requirement of collaborative plan execution, controls execution of a collaborative plan, and allows user to select mechanism for controlling plan execution.

BRIEF DESCRIPTION OF THE DRAWINGS

The other objects, features and advantages will occur to those skilled in the art from the following description of the preferred embodiment and the accompanying drawings in which.

Although the specific features of the present invention are shown in some drawings and not in others. This is done for convenience only as each feature may be combined with any or all of the other features in accordance with the present invention.

DETAILED DESCRIPTION OF THE INVENTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The various embodiments disclose a system and method to control execution of a centralized and decentralized controlled plan collaboratively by a plurality of autonomous robots. In one embodiment, a plan is a sequence of tasks that are to be executed to achieve a particular goal or solve a particular problem or sub-problems of the problem. A task is a portion of plan. Executing a task solves one or more sub-problems or problem.

In one embodiment, controlling the plan execution includes managing the entire lifecycle of plan execution including determining several plan execution values. For example, controlling the plan execution includes determining task allocation of different tasks within the plan to different autonomous robots. These plan execution values may be determined at different stages of plan execution as well as in real-time based on a change in the environment or robot's condition. For example, task allocation to robots may be determined at different stages of plan execution or in real time, for example when any of the autonomous robots assigned to a particular task breaks down and the task has to be reassigned to other robots have not broken down and are capable to execute this task.

In one embodiment, a plan has to be executed by several robots, for example, mapping of several autonomous robots to several tasks and controlling plan execution includes controlling plan execution by several robots. In addition, several operations for controlling plan execution, for example determining autonomous robots position based on dynamically changing conditions, has to be performed in real time. Controlling plan execution for several robots in real-time is therefore process intensive. In one embodiment, controlling the plan execution is a non-deterministic polynomial-time hard problem (NP-hard problem).

In one embodiment, a plan execution engine alone or in collaboration solves the NP-hard problem. A plan execution engine is a software module that includes logic to perform different operations required to control plan execution. For example, the plan execution engine stores the logic to determine assignment of tasks included in the plan to different autonomous robots, solves different constraint problems related to the plan, synchronize execution of the plan, etc. Each autonomous robots executes the plan execution engine for executing the plan.

In one embodiment, during the modelling of the plan a user may select whether the plan is centralized controlled or decentralized controlled. When the plan is selected as decentralized controlled then the plan execution is controlled collaboratively by several autonomous robots. In the decentralized controlled plan, the plan execution engines at the autonomous robots collaboratively solve the NP-hard problem of controlling plan execution by individually determining plan execution values for the plan that are then shared with other plan execution to confirm that same plan execution values are determined by plan execution engines executing at other autonomous robots. As the plan execution values for decentralized controlled plan execution is being determined individually by each plan execution engine without communication between the plan execution engines the plan execution engine in decentralized controlled plan provides quick reaction time. Further, comparing the determined execution result with each other provides stability to the determined plan execution values.

In case additional compute power is required for determining plan execution values along with the compute power provided by plan execution engines executing at the autonomous robots then the plan execution may be centralized controlled. Centralized controlled plan execution is a plan execution that is controlled centrally by a plan execution engine executing at one or more cloud nodes. In this case, the plan execution engine at the cloud node is started in a "centralized control" mode. In the "centralized control" mode the plan execution engine centrally controls plan execution by autonomous robots. Depending on the plan execution control, the present invention therefore allows a user to easily solve the NP-hard problem of controlling plan execution either collaboratively by several robots or centrally by a cloud node that provides additional computation capability.

Figure 1:
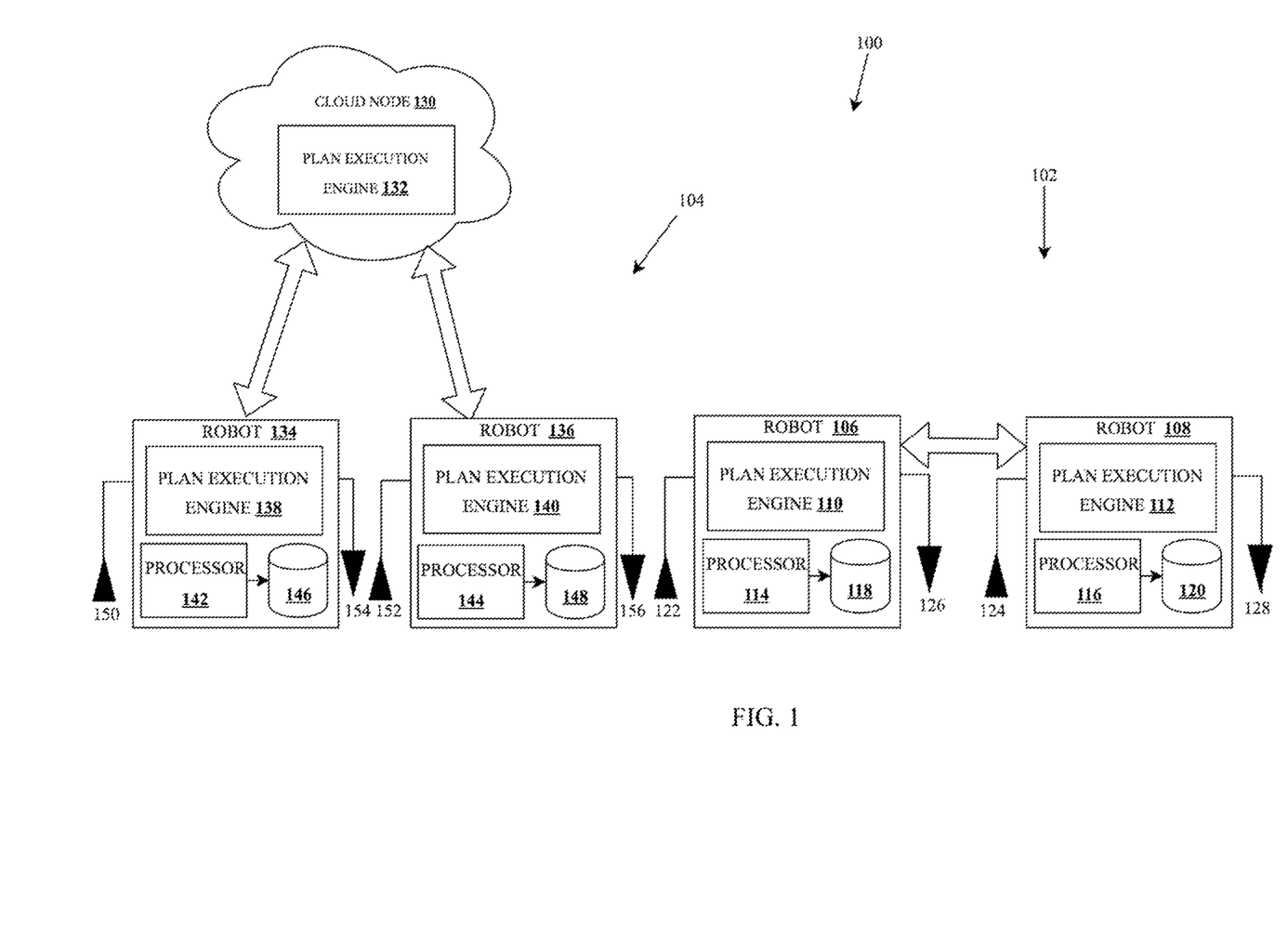
FIG. 1 is a block diagram illustrating a system executing a centralized controlled plan and a decentralized controlled plan, according to an embodiment.

FIG. 1 illustrates an exemplary system 100 executing a centralized controlled plan and a decentralized controlled plan, according to an embodiment. A portion 102 of the system 100 executes the decentralized controlled plan and a portion 104 of the system executes the centralized controlled plan. The portion 102 of the system 100 executing the decentralized controlled plan includes two autonomous robots 106 and 108 that are executing plan execution engines 110 and 112, respectively. In one embodiment, the autonomous robots 106 and 108 include processors 114 and 116 and memory 118 and 120, respectively. The processors 114 and 116 execute the plan execution engine 110 and 112, respectively.

In one embodiment, the plan execution engines 110 and 112 are integrated into a domain specific framework which comprises of other components such as a communication middleware to establish communication between the robots 106 and 108, and sensor and actuator drivers to send and receive data from sensors 122, 124 and actuators 126, 128 of the robots 106 and 108, respectively.

In one embodiment, the robots 106 and 108 executing the plan execution engines 110 and 112, respectively, communicate with each other via wireless communication. In one embodiment, the plan execution engines 110 and 112 executing the decentralized controlled plan individually determines the plan execution values for controlling execution of the plan and then share the determined plan execution values with other plan execution engines. Based on the received plan execution values, the plan execution engine compares the determined plan execution values with the received plan execution values that are received from plan execution engines executing at other robots. For example, the plan execution engine 110 and 112 individually determine task allocation for a plan to the robots 106 and 108. The plan execution engine 110 and 112 then share the determined task allocation with each other to determine any conflict in the determined task allocation.

In one embodiment, the plan execution engines 110 and 112 periodically sends a plan execution status that includes the task being performed by a robot and/or any sensor data captured by the sensor of the robot to other plan execution engine. Based on the received plan execution status and a sensor data detected by the robot the plan execution engine determines plan values for plan execution. For example, the plan execution engine 112 receives plan execution status of the robot 106 from the plan execution engine 110 and the sensor data captured by the sensor 122 based on which the plan execution engine determines the plan execution value.

In one embodiment, the plan execution engines 110 and 112 executing a decentralized controlled plan follow a locality principle, i.e., the plan execution engines 110 and 112 executing at the autonomous robots 106 and 108, respectively, determine plan execution values only for a plan that the robots 106 and 108 are currently executing. The locality principle ensures that the plan execution engines 110 and 112 at the robots 106 and 108 are not overloaded by controlling plan execution of a plan that the robots 106 and 108 are not currently executing.

The portion 104 of the system 100 executing the centralized controlled plan includes a cloud node 130 executing a plan execution engine 132, and two autonomous robots 134 and 136 executing plan execution engines 138 and 140, respectively. In the centralized controlled plan execution 104, the plan execution engine 132 executing at the cloud node 130 controls execution of the centralized controlled plan. In one embodiment, the plan execution engine 132 executing at the cloud node 130 is started in the "centralized control" mode. The plan execution engine 132 started in the "centralized control" mode is not tied to a particular robot and do not follow the locality principle. In this case, the plan execution engine 132 executing at the cloud node 130 can centrally control the execution of the centralized controlled plan. For example, the plan execution engine 132 executing at the cloud node 130 determines the task allocation of plan for the robots 134 and 136 and sends the instruction to execute the task to the plan execution engines 138 and 140, respectively. In one embodiment, the robots 134 and 136 have processors 142 and 144 and memory 146 and 148, respectively. The processors 142 and 144 execute the plan execution engines 138 and 140, respectively. The plan execution engines 138 and 140 receives sensor data captured from the sensors 150 and 152, respectively. The captured sensor data is send to the plan execution engine 132. Based on the received task allocation, the plan execution engines 138 and 140 sends the instructions to actuators 154 and 156, respectively, which execute the task.

Additionally, the plan execution engine 132 that is started in the "centralized control" mode also participates in actively collaborating with plan execution engines 138 and 140 to execute some of the plan execution control operations. For example, the plan execution engine 132 actively collaborate with the plan execution engines 138 and 140 to solving a constraint problem or synchronizing execution of the plan.

In one embodiment, a plan is modelled before plan execution. During the modelling operation, a user can specify at a user interface whether the plan has to centralized controlled plan or a decentralized controlled plan. In one embodiment, the selection between a centralized and decentralized controlled plan may be automatically determined, for example a plan may be determined as centralized controlled plan when controlling the plan execution requires additional computation. A centralized controlled plan and a decentralized controlled plan may be executed in parallel or one after another in order to solve a common problem or disjoint problems within the same environment.

For example, consider an order fulfillment operation in a warehouse that requires two plans, an order preparation plan and an order delivery plan. The order preparation plan may include the steps of identifying the items included in the order, picking the items, and assembling the items at a picking point. The order delivery plan includes the steps of transporting items from the picking point to a delivery point and finally packaging the item at the delivery point.

A user can select the order preparation plan as a centralized controlled plan and the order delivery plan as a decentralized controlled plan. In the centralized controlled order preparation plan, a cloud node determines assignment of "identifying the item" task to a robot that has a camera to capture/scan image and the task of "picking and assembling" to autonomous robots that has wheels and can carry weight from the origin to the picking point. In the decentralized controlled order delivery plan two or more available autonomous robots may collaboratively determine the task assignment of the transportation task and the packaging task. In one embodiment, the centralized and decentralized controlled plan may have a hierarchical relationship with each other, i.e., a centralized controlled plan or a decentralized controlled plan may be included as a branch of steps of a decentralized or centralized controlled plan, respectively.

The present solves a technical problem in the field of controlling plan execution by multiple autonomous robots. The invention allows a user to easily select the plan as centralized controlled or decentralized controlled depending on several parameters, for example, faster processing time, additional processing complexity, etc. Further, the plan execution engine also provides the flexibility to easily execute a centralized controlled plan by plan execution engine executing at cloud node or a decentralized controlled plan by plan execution engine executing at the robots.

Figure 2:
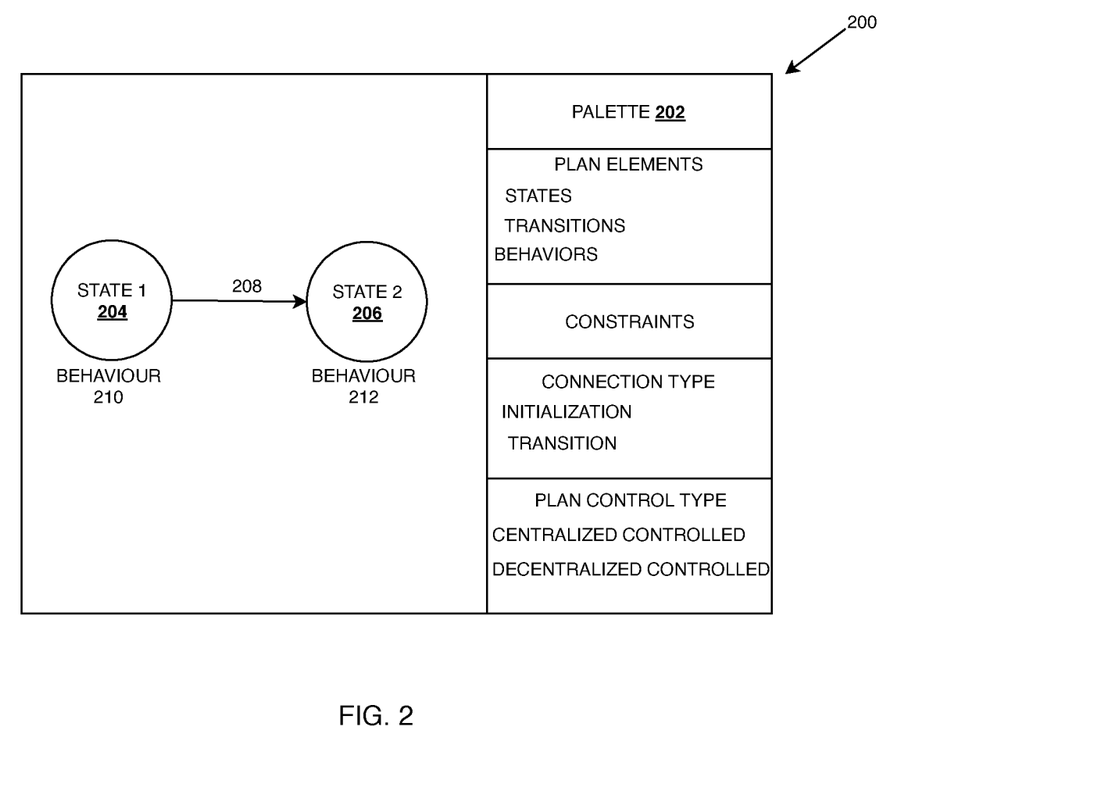
FIG. 2 is a flow diagram illustrating an exemplary graphical user interface of a graphical tool for modelling a plan, according to an embodiment.

FIG. 2 is a an exemplary graphical user interface 200 for modelling a plan, according to an embodiment. In one embodiment, the plan is a collection of states that represent stages during the execution of the plan. In one embodiment, each pair of states in the plan may be linked by a transition.

A transition is a condition that needs to be satisfied in order for a robot to traverse from its current state to the next state. In each state, one or more autonomous robots execute a set of sub-plans within the plan. The one or more autonomous robots may transition to the next state either after successful execution of the sub-plans, when the task fails, or when execution of sub-plans becomes irrelevant.

For example, consider a transport plan to transport an object from a source location to a destination location. This plan includes three states: a "picking" state in which autonomous robots execute an object picking sub-plan at the source location, a "transportation" state in which autonomous robots transport the object from source location to destination location, and a "delivery" state in which the autonomous robots drops or delivers the object to the destination location. The transition from the "picking" state to the "transportation" state has a corresponding transition condition "when the robot has grabbed the object" which when satisfied causes the robot to transition from "picking" state to "transportation" state. Initially, one or more autonomous robots in the "picking" state are assigned the task of picking an object. When the autonomous robots pick the object, the transition condition "robot has grabbed the object" is satisfied, after which the robot transitions to "transportation" state where autonomous robots transport the picked object to the destination location.

Before execution of the plan, the plan is modelled at the user interface 200. Modeling the plan includes defining different portions of the plan, for example, tasks, states, transitions, etc. Modeling the plan also includes defining different constraints, utility functions, behaviors, etc. Further, modeling the plan also includes selecting the plan control type, i.e., selecting whether the plan is centralized controlled or decentralized controlled.

In one embodiment, the plan is modeled as a collection of states with transitions connecting each pair of states. The graphical user interface 200 also allows a user to graphically represent relationship between different plan elements. For example, as shown the user interface 200 allows a user to model a plan by selecting states, state 1 (204) and state 2 (206), and a transition 208 between the states for a particular plan. In one embodiment, the graphical user interface 200 also allows a user to select allowed robot behaviors at each state. Robot behavior is a low level atomic activity executed by a robot under certain conditions within the state. Different robot behaviours 210 and 212 are defined for each state, state 1 204 and state 2 206, respectively. In one embodiment, the user interface 200 constraints the plan such that the plan is defined as a plan-tree that has states as nodes of the tree and transition as edges between the nodes. Each group of states connected by transitions start with an initial state.

During modeling of the plan, the graphical user interface 200 also allows a user to define constraints for the plan. These constraints may be a pre-runtime condition, a runtime condition, or a post-runtime condition relating to the states of the plan. A pre-runtime condition needs to be satisfied before autonomous robots can enter a particular state. A runtime condition represents the condition that needs to be satisfied during the execution of the plan by the autonomous robots. A post-runtime condition is a condition that is to be satisfied for the plan to be successful.

Further, the graphical user interface 200 also allows a user to select a set of utility functions that defines conditions for dynamic allocation of autonomous robots to the different tasks. The utility functions include a weighted sum of several functions that are domain dependent. Each weight in the utility function represents the priority of tasks in a particular scenario. For example, consider an "item delivery" plan that includes two tasks "picking the item" and "delivering the item". A user can model the utility function such that more autonomous robots are assigned to the task "delivering the item" then to the task "picking the item". In this case, a utility function may provide a weight of 0.1 to the task "picking the item" and 1 to the task "delivering the item".

In one embodiment, the graphical user interface 200 also allows a user to select a plan control type, i.e., centralized controlled or decentralized controlled. The present invention therefore allows a user to easily select between different plan control type by a single selection at the user interface 200.

Robot behaviour is a low level atomic activity executed by a robot under certain conditions within the state. As shown in FIG. 2, the graphical user interface 200 may provide a palette 202 that allows user to select plan elements (state, transition, behaviors,) etc., constraint conditions, connection type (initialization, transition), and plan control type (centralized controlled or decentralized controlled). In one embodiment, a plan is reusable, i.e., a previously defined plan may be reused to solve another sub-problem or problem. Further, the plan being modelled may be used as a sub-plan during modeling of another plan.

Finally, a graphical tool that includes the graphical user interface 200 converts the modeled plan into a code executable format that is executable by the plan execution engine. A graphical tool is a development platform that allows modelling the different part of the plan and generating a code from the model in a model-driven fashion. In one embodiment, the code may be provided in a markup language format, for example eXtensible Markup Language (XML) language format, that is stored in a memory and loaded to the plan execution engine, during runtime.

Figure 3:
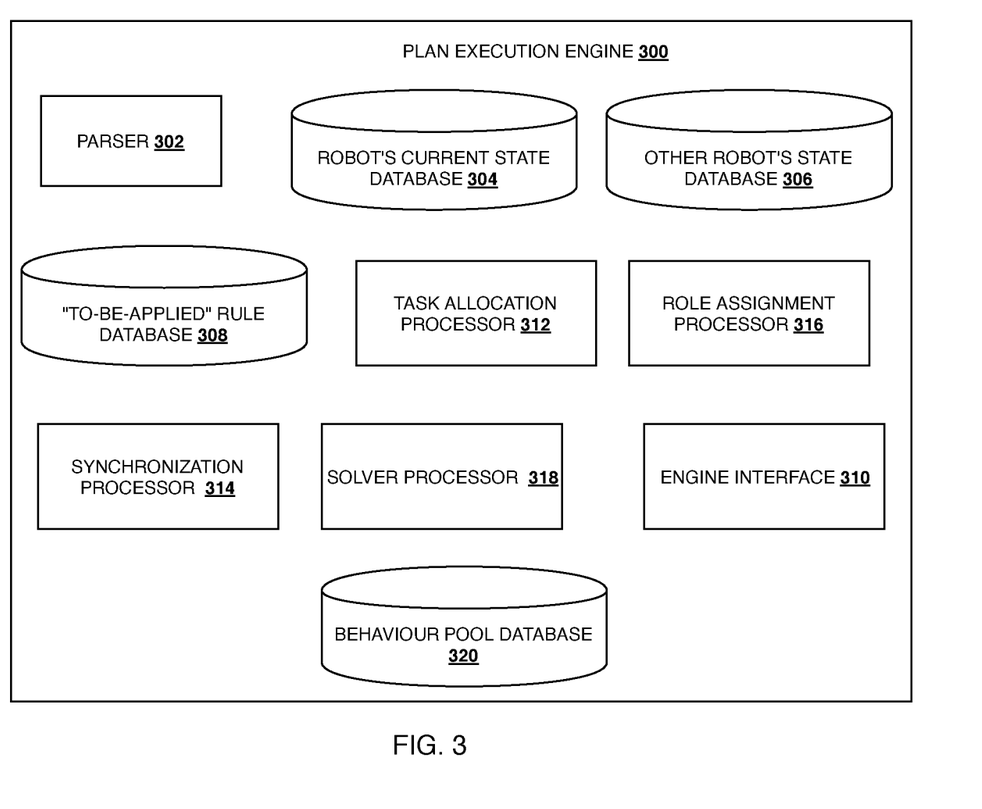
FIG. 3 is a detailed block diagram illustrating a plan execution engine, according to an embodiment.

FIG. 3 is a detailed block diagram illustrating a plan execution engine 300, according to an embodiment. A plan execution engine 300 includes a parser 302 that parses a stored plan to build an internal representation of the plan. As discussed above, the generated plan model is stored as a markup language code. In one embodiment, the parser parses the stored markup language to generate the internal representation of the program.

The plan execution engine 300 further includes a "robot's current state" database 304 that stores the current state of the robot. The "robot's current state" database 304 includes the plan state that the robot is currently inhabiting, the task allocated to the autonomous robots in this state, and the plan that the robot is executing. The plan execution engine 300 also includes "other robot's state" database 306 that includes the state of the other autonomous robots executing the plan. In this case, the "other robot's state" may include the plan, task, and state of the other autonomous robots.

In one embodiment, the plan execution engine 300 executing at the other autonomous robots establish a communication with the plan execution engine 300 executing at the robot to receive the robot's current state. In one embodiment, the different plan execution engines may publish or broadcast the state of their corresponding autonomous robots that is subscribed to by the plan execution engine of the other autonomous robots. The communication may be established using communication mechanism provide by Robot Operating System, Data distribution Service, or using simple UDP proxy, etc. The plan execution engine may communicate with each other within a particular communication frequency range, for example, 15 Hz to 30 Hz.

In one embodiment, the plan execution engine 300 executing at a cloud node may not have the "current robot's state" database 304. The plan execution engine 300 executing a centralized controlled plan at the cloud node receives the robot's state of autonomous robots executing the centralized controlled plan and stores it at the other robot's state database.

The plan execution engine 300 also includes a "to-be-applied rule" database 308 that includes a list of rules that are to be applied on the "robot's current state" database 304. The "to-be-applied rule" database 308 is invoked periodically by the "robot's current state" database 304 that is updated based on applying the rule on the "robot's current state" database 304. Further, the plan execution engine 300 include an engine interface 310 that provides functionality to start the engine, access different components, and configure its runtime behavior.

The plan execution engine 300 also includes a task allocation processor 312, a synchronization processor 314, a role assignment processor 316, and a solver 318 that determines task allocation, synchronizes execution by multiple autonomous robots, assigns roles to autonomous robots, and solves constraint problem, respectively. The plan execution engine 300 also includes a behavior pool database 318 that stores one or more behaviors available to a particular robot. The behaviors for a particular robot depends on the features, for example wheels, or sensors, for example temperature, light, or heat sensor, available at the robot. Depending on the current state of the robot one or more robot behaviors required for executing the task is invoked.

In one embodiment, the behavior pool database 320 is only provided for plan execution engine executing at the autonomous robots. The invoked behaviors communicate with actuation controllers of the robot that communicate with robotic hardware or software actuators to execute the task. The plan execution engine 300 executing at the autonomous robots also communicate with sensors to receive the sensor data and forward the sensor data to other plan execution engines at other autonomous robots or cloud node.

Figure 4:
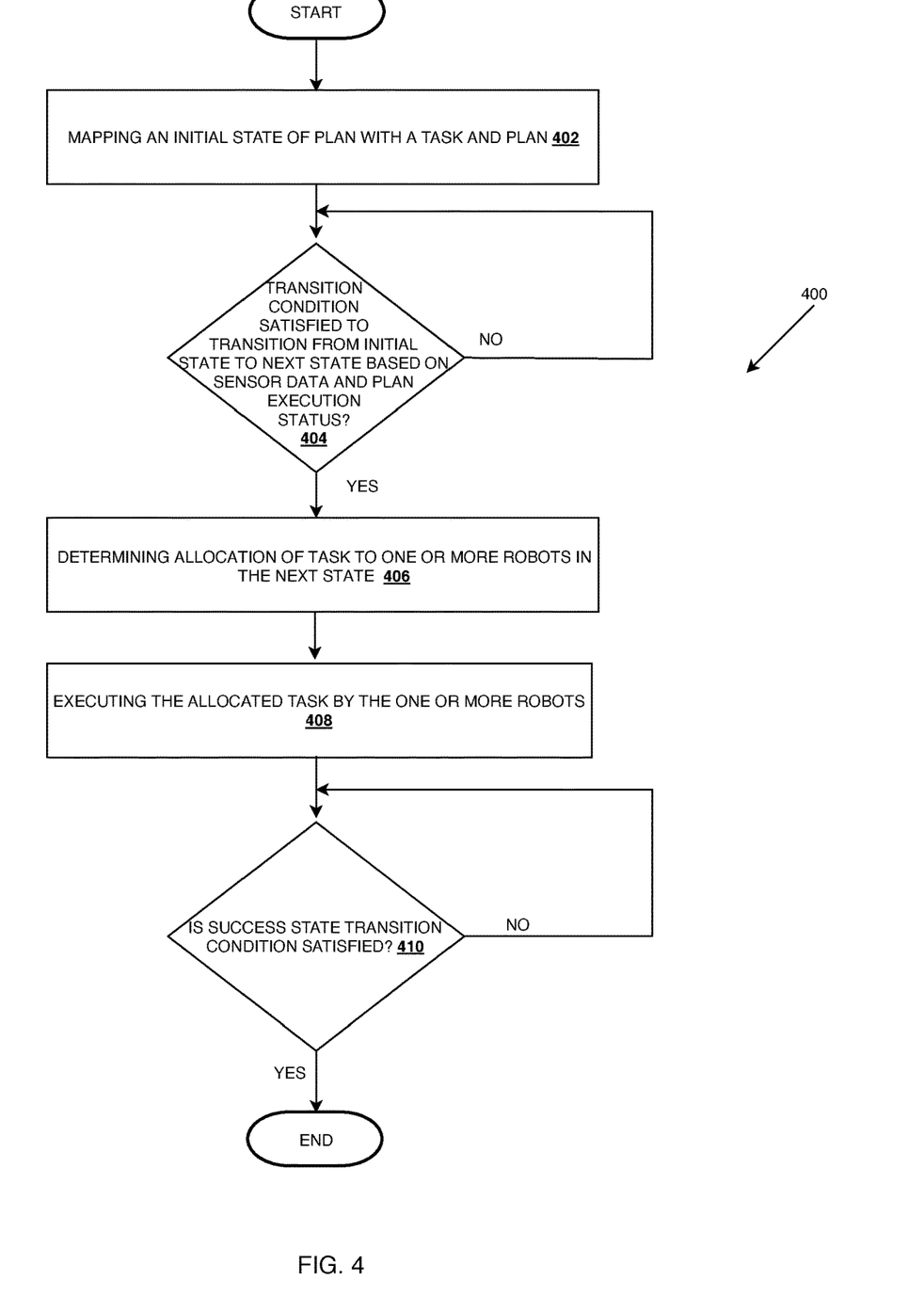
FIG. 4 is a high-level flow diagram illustrating a process to execute the plan by plan execution engines executing at the autonomous robots or cloud node and autonomous robots, according to an embodiment.

FIG. 4 is a high-level flow diagram 400 illustrating a process to execute the plan by plan execution engines executing at the autonomous robots or cloud node and autonomous robots, according to an embodiment. As discussed above, each of the autonomous robots and the cloud node have a corresponding plan execution engine. The process is executed by each of the plan execution engines, either alone or in collaboration with plan execution engine executing at other autonomous robots and/or cloud node.

As discussed above, a set of rules stored in the rules database are applied on the plan to execute the plan. Initially a plan execution engine maps an initial state of the plan with a plan and task of the plan (402). In one embodiment, plan execution engine executing at the autonomous robots or the cloud node execute an initialization rule to map the initial state of the plan with a plan and task of the plan. As discussed above, a plan is modelled as a plan-tree that is a hierarchical structure of states within a plan. The initial state of the plan is the first state in the plan-tree. The initial state needs to be mapped to a task that is to be executed in the particular state. One or more autonomous robots are then assigned to the task mapped to the initial state. When a robot is allocated to a task within the plan then the "robot's current state" database stores the current state of the plan that the robot is inhabiting, the task assigned to the robot, and the plan.

In case of a centralized controlled plan, the initialization rule is executed by the plan execution engine executing at the cloud node that determines the mapping of the plan and task with the initial state. The plan execution engine executing at the cloud node then determines an assignment of the task mapped to the initial state with one or more autonomous robots. The cloud node then sends the assignment of the task to the plan execution engine of the respective robot or autonomous robots that are assigned the task.

In case of decentralized controlled plan, the plan execution engine at the autonomous robots individually execute the initialization process and then the autonomous robots collaboratively confirm the allocation of the task by the other autonomous robots. In one embodiment, the plan execution engine at the cloud node or the different autonomous robots initiate the execution of the initialization process when the plan execution store is empty, i.e., does not store a plan, task, store tuple.

After the initialization, any of the rules in the "to-be-applied" rule database 308, shown in FIG. 3. may be executed by the plan execution engine based on the current state of the robot within the robot's current environment. In one embodiment, a determination is made whether a transition condition to transition the autonomous robots from initial state to next state is satisfied based on sensor data and plan execution status (404). As discussed above, one or more autonomous robots that are assigned to a task, mapped to a particular state, executes the task. In one embodiment, after the execution the plan execution engine of the executing robot share the plan execution status including result of the task execution. In case of the centralized controlled plan the plan execution status is shared with the cloud node by the one or more autonomous robots assigned to the task. In case of decentralized control plan the result is shared between one or more autonomous robots assigned to the task. As discussed above, the plan execution engine also receives the sensor data measured by the sensor.

The plan execution engine receiving the plan execution status including the execution result and the sensor data determines whether a transition condition corresponding to the current state of the robot is satisfied based on matching the execution result and the received sensor data. A transition condition defines a condition that needs to be satisfied for a robot in a particular state to transition to the next state in the plan tree. When the plan execution engine determines that the execution result satisfies a transition condition then the one or more autonomous robots inhabiting the current state are transitioned to the next state.

For example, consider that the task being executed by a robot in its current state is "searching a target". "Target found" is a transition condition between the current state "searching a target" and next state "transport the target" at the plan-tree. When the autonomous robots in the state "searching a target" find the target being searched then the execution result of the task is "target found". As the execution result "target found" matches the transition condition "target found" the robot transitions from the "searching a target" state to the "transport the target" state. When a transition condition is satisfied the robot execution engine terminates execution of the behaviour, plans, or plan types executing in context of the current state. For example, the robot execution engine terminates the execution of a robot behavior corresponding to a "searching a target" task when the transition condition "target found" is satisfied.

In one embodiment, when several autonomous robots are executing the task mapped to the current state then the robot execution engines included in the autonomous robots terminate execution of the plan, plantypes, and behaviours executing in context of the state when a "state change message" indicating that the autonomous robots are to transit to the new state and terminate execution of the plan, plan types, and behaviour executing in the context of the state, is received.

In case of centralized controlled plan, the robot execution engine sends an execution result to the robot execution engine executing at the cloud node. The robot execution engine executing at the cloud node then determines whether the execution result matches a transition condition. Based on the determination, the plan execution engine at the cloud node sends the "state change" message to the plan execution of the autonomous robots. In case of decentralized controlled plan, the robot execution engine of a robot sends an execution result to the robot execution engine executing on other autonomous robots. The robot execution engines at all autonomous robots determine whether the execution result matches a transition condition. In case a match is determined, the robot execution engine at both the autonomous robots terminate execution of the task mapped to the current state by the autonomous robots.

In one embodiment, two or more transitions conditions are included in a synchronized transition condition. A synchronized transition requires two or more transition conditions to be satisfied simultaneously before autonomous robots satisfying each of the transition condition can transition to a new state. For example, two transition conditions "order received" and "destination found" may be included in a synchronized transition condition. Consider that a transition condition for a first robot in a particular state is "order received" transition condition and a transition condition for a second robot in a particular state is "destination found". In this case, when a first robot receives an order fulfillment request in a warehouse then the "order received" transition condition is satisfied. The first robot waits for second robot to find the order delivery destination to satisfy the transition condition "destination found" before the first robot is transitioned from its current state to the next state.

In case of centralized controlled plan, the plan execution engine executing at the cloud node manages the synchronized transition. For example, the plan execution engine at the cloud node receives an execution result from a plan execution engine executing on a robot and determines whether the transition condition matches with the execution result. In case a match is determined then the cloud node awaits receiving another execution result, from another robot, which matches with another transition condition synchronized with the transition condition.

When both the transition conditions included in the synchronized transition condition are satisfied then the plan execution engine executing at the cloud node sends "state change" messages to the plan execution engines executing at the autonomous robots to transit the autonomous robots from their current states to other states.

In case of decentralized controlled plan, the plan execution engine executing at a robot sends the execution result to plan execution engines executing on other autonomous robots. Based on comparing the received and determined execution result with transition conditions included in a synchronized transition, the plan execution engines determine whether the autonomous robots may transit from the current state to the next state.

Next in case the transition condition is satisfied (condition in 404 is true) then the plan execution engine determines allocation of tasks to one or more autonomous robots in the next state (406). The plan execution engine allocates the tasks based on the robot capabilities and the capabilities required for executing the tasks. Further, task allocation is also dependent on the utility function corresponding to the plans being executed. For centralized controlled plans, the plan execution engine executing at the cloud node determines task allocations for all autonomous robots currently in a particular state. The plan execution engine forwards the determined tasks allocations to the autonomous robots. In case of decentralized controlled plan, each robot determines task allocation for itself and other autonomous robots in the same state. Each robot then shares the determined task allocation with other autonomous robots to identify conflicts, if any, in task allocations determined by different autonomous robots.

In one embodiment, one or more constraints become active for the autonomous robots assigned to the new state.

A constraint defines a particular condition that the autonomous robots have to satisfy during execution. For example, a constraint for a group of autonomous robots transporting a weight may be that two autonomous robots cannot travel in opposite direction during the transportation of the weight. Based on the constraint, the robot direction of motion with respect to each other is determined that is used by the autonomous robots assigned to the transportation task for collaboratively transporting the weight.

Finally, the plan execution engine determines whether a success state condition is satisfied indicating successful execution of the plan (410). In one embodiment, a plan tree of a plan may not have a success state, for example when a plan has to be continuously executed. In this case, the plan may continuously execute without termination.

In one embodiment, the success state may be a last state in the plan-tree. When the success state condition of a plan is satisfied then the different autonomous robots executing the plan may terminate execution of the plan. In one embodiment, a plan may be successfully executed even when some of the non-essential tasks are not executed. For example, a set of autonomous robots tasked with transporting some equipment through unknown terrain. In this case some autonomous robots may scout ahead for the best route to avoid carrying the equipment over unnecessarily long routes. However, if only a few autonomous robots are available, scouting can be omitted in favour of more transporting autonomous robots. Hence the plan can still succeed even though the scouting task is not completed.

In case the success state condition is not satisfied then a failure state may be identified for the autonomous robots executing the plan. The plan execution engine stores several repair rules that may be executed when the plan execution fails, i.e., when the failure state is identified. In one embodiment, "BAbort" rule is a repair rule that stops execution of a behavior when the failure state is identified. Another repair rule "BRedo" tries to re-execute a failed behaviour if possible. A "BProp" rule propagates the failure upwards to the previous state in the plan in whose context the failed behavior executed.

"PAbort" rule is similar to "BAbort" rule, however the "PAbort" rule stops execution of the failed plan instead of a failed behavior and all plans and behaviors executed in its context. However, "PAbort" rule can be overridden by "PRedo" rule which resets the agent's state within a failed plan if possible. This avoids computational and possibly communication overhead, as autonomous robots continues to work on its task, and does not calculate a new allocation.

In case "PAbort" rule stops a plan, "Preplace" repair rule triggers a new task allocation. A new task allocation can also choose an alternative plan. A "PProp" repair rule propagates a failure upwards to the parent plan. Finally, "PTopFail" repair rule captures the case where the top-level plan has failed, and simply triggers a clear initialization by triggering an initialization rule.

Figure 5:
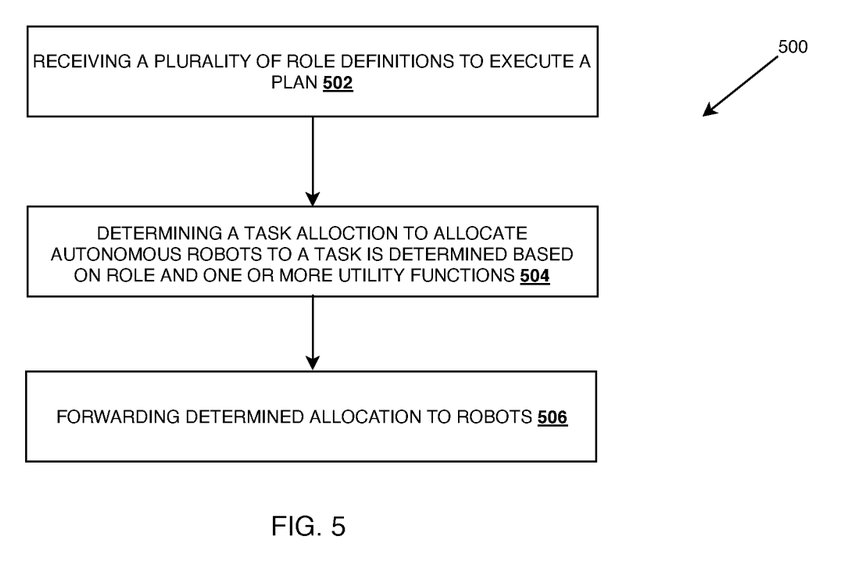
FIG. 5 is a flow diagram illustrating a process to determine allocation of a task included in a plan to one or more autonomous robots, according to an embodiment.

FIG. 5 is a detailed flow diagram 500 illustrating a process to determine allocation of a task included in a plan to one or more autonomous robots, according to an embodiment. As discussed above, at each state in the plan tree one or more autonomous robots are to be assigned to the tasks in the state.

Each robot has one or more capabilities based on the different components included or attached to the robot. For example, a robot may be a mobile robot when it has wheels or a picking robot when it has a robotic arm. A capability is a description of specific skill, or ability, together with a comparative rating of the skill. For example, two mobile autonomous robots may have a comparative rating that indicate whether a robot 1 is slower or faster compared to robot 2. The different tasks within a plan also requires different capabilities for a robot to execute the task.

For example, a transportation task that requires one or more autonomous robots to transport an object from one location to another location requires movable autonomous robots for executing the transportation task. In order to assign different autonomous robots to tasks within a plan, a plurality of roles definitions are received at a plan execution engine to execute the plan (502). A role defines a capability required to execute a task within the plan. In case of centralized controlled plan, the plurality of role definitions from the robots are received at plan execution engine at the cloud node. In case of decentralized controlled plan, the plan execution engine at the robot receives the role definitions.

In one embodiment, the roles are defined for tasks to be executed in the plan. For example, consider an order fulfillment plan that requires sorting of items, picking of items, transportation of items, and storage of items. For this plan, a sorter role, a picker role, a transporter role, and a storage role are defined for executing the different tasks in the order fulfillment plan. Each of the role requires one or more capabilities that a robot needs to have in order to execute this task.

In one embodiment, a role allocation for one or more autonomous robots is determined based on the capabilities of the robot. For example, a robot with wheels may be allocated a role of "transporter". In one embodiment, a role allocation score is determined that represents the similarity between the role and the robot's capability. The similarity score is a value between −1 and 1. A score of −1 represents that the robot cannot be assigned to the particular role. A value of 1 represents a complete mapping between role and the robot's capability.

Next a task allocation is determined to allocate autonomous robots to a task based on the role and one or more utility functions (504). In one embodiment, an order list of autonomous robots for a particular task is determined based on the role allocation score. The utility condition is then used to select a robot to task mapping by determining a utility value of autonomous robots for executing the different tasks. A utility function specify a pre-defined real-world condition that indicate a utility of assigning a particular robot to a task based on the robot's environment.

For example, a utility function in a warehouse transportation task may include weights that a robot with a role "transporter" has the highest utility when the robot is within 0.5 meters of the ordered object. Based on this utility function, utility of autonomous robots with role "transporter" is determined based on their distance from the ordered object, i.e., a robot within 0.5 meters of ordered object is provided a higher utility value compared to a robot outside the 0.5 meters distance. In one embodiment, the autonomous robots assigned to a role required for executing the task and having highest utility function is determined to be allocated to the task. For example, the robot mapped to the role "transporter" and being within the 0.5 meters of the target object, i.e., having highest utility value, is determined to be assigned to the warehouse transportation task.

In case of decentralized controlled plan, the allocation of autonomous robots to the task is determined whenever autonomous robots enter a particular state. Plan execution engine executing at each of the autonomous robots locally execute the operations at 502-504 to determine task allocation based on the capability and the utility condition related to the autonomous robots. In one embodiment, each of the robot follows a subscribe-and-broadcast approach, where autonomous robots broadcast the determined role allocation and the determined environment condition that is subscribed by other autonomous robots.

In case the robot is incapable of performing an allocated task then this information is also broadcasted to other autonomous robots and the task allocation is re-determined by the plan execution engines at the autonomous robots. For example, in case the wheels of a robot is damaged and it is incapable of executing the allocated transportation task then this robot broadcasts this information to other autonomous robots that re-determine the task allocation for the transportation task.

In case of centralized controlled plan, the plan execution engine at the cloud node executes the operations at 502-504 to determine the task allocation based on robot capability and external condition information received from the autonomous robots. The cloud node then sends the determined task allocation to the different autonomous robots.

Figure 6A:
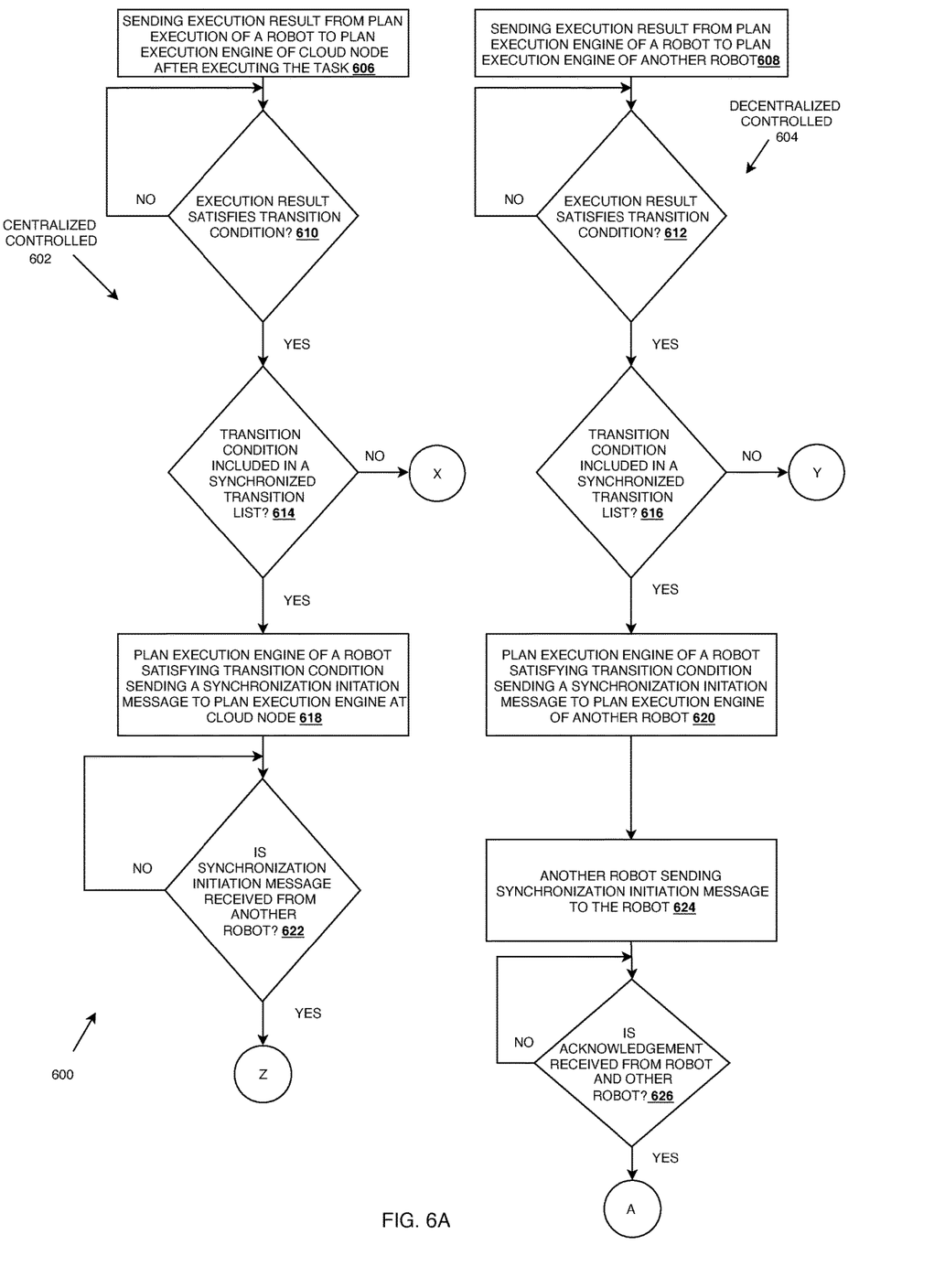
FIGS. 6A-6B is a process flow diagram illustrating a process to execute synchronized transition, according to an embodiment.
Figure 6B:
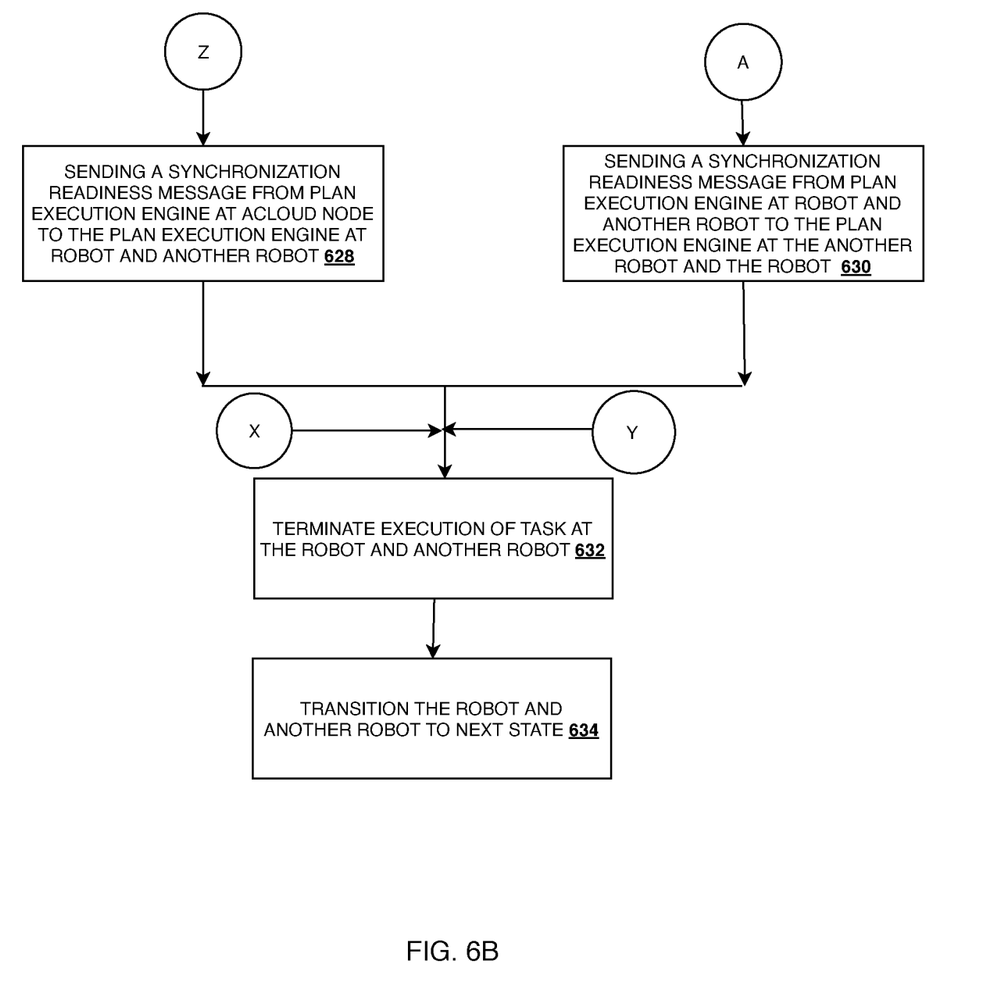

FIGS. 6A-6B is a detailed process flow diagram 600 illustrating a process to execute synchronized transition, according to an embodiment. Transition is a process of one or more autonomous robots exiting the current state and entering the next state when a transition condition is satisfied. In one embodiment, two or more transitions are synchronized, i.e., two or more autonomous robots are transitioned to a new state when transition conditions of two or more synchronized transitions are satisfied.

For example, consider two transition conditions in a transportation plan: an "object picking" condition and a transportation cart reaching the picking location" transition condition in the transportation plan. These two transition conditions may be defined as synchronized transitions, i.e., both the transition conditions are to be satisfied together for autonomous robots satisfying any of the transition condition to transit to the next state. For example, the robot or autonomous robots that picked the object and the transportation cart that either on its own or based on an external push from a robot or autonomous robots reach the destination location may transit to the next state when both the actions, representing transition conditions, are completed.

The block diagram corresponding to 602 and 604 disclose the synchronization transition for a centralized controlled plan and a decentralized plan. As discussed above, a plan execution engine at a robot sends an execution result, as a periodic state update, after executing the task to the cloud node when the plan is centralized controlled (606). In case of a decentralized controlled plan, a robot sends execution result to another robot (608).

Next the plan execution engine at the cloud node determines whether the execution result satisfies a transition condition when the plan is centralized controlled (610). In case of decentralized controlled plan, the plan execution engine at the receiving robot determines whether the received execution result satisfies a transition condition (612).

Next when the execution result satisfies the transition condition (condition in 610 and 612 are satisfied) then the plan execution engine at the cloud node or another robot determines whether the transition condition is included in a synchronized transition condition (614 and 616, respectively).

In case of a centralized controlled plan, when the transition condition is determined to be included in a synchronized transition condition (condition in 614 is true) then the plan execution engine at one of the autonomous robots satisfying the transition condition sends a synchronization initiation message to plan execution engine at the cloud node (618). In case of a decentralized controlled plan, when the transition condition is determined to be included in a synchronized transition condition (condition in 616 is true) then the plan execution engine at one of the autonomous robots satisfying the transition condition sends a synchronization initiation message to plan execution engine at another robot (620). In one embodiment, another robot may be one or more autonomous robots in the same state as the robot. Another robot may also include robot in another state that has a transition condition synchronized with the transition condition of the one of the autonomous robots. A synchronization initiation message indicates a robot's readiness to initiate the synchronization process.

In case of centralized controlled plan, the plan execution engine at the cloud node determines whether synchronization initiation message is received from another robot related to the synchronized transition (622). The other robot may be a robot that send an execution result matching a transition condition included in the synchronized transition.

Next in case of decentralized controlled plan execution, the plan execution engine at another robot sends synchronization initiation message to the robot (624). Another robot may be a robot that has an execution result satisfying another transition condition included in the synchronized transition condition. In one embodiment, each of the autonomous robots broadcast the synchronized transition message that is subscribed by other autonomous robots.

Next in case of decentralized controlled plan, a check is performed to determine whether each of the robot and other robot received acknowledgment from each other (626). The plan execution engine at a robot receiving the synchronized transition message sends an acknowledgment message to the robot that sends the synchronized transition message. An acknowledgment message is sent by the robot to each robot from which a synchronized transition initiation message is received.

Next in case of centralized controlled plan, the plan execution engine at the cloud node sends a synchronization readiness message to the one of the robot and another robot when synchronized transition message is received from the robot and another robot (condition in 622 is true) (628). In case of decentralized controlled plan, the plan execution engine at one of the robot and another robot sends a synchronization readiness message to the robot and another robot when acknowledgment message is received from the one of the robot and another robot (condition in 626 is true) (630). A synchronization readiness message indicates that the condition for synchronized transition is satisfied. Based on the broadcasted synchronization readiness message, the one of the robot and another robot terminate execution of task within a plan (632). Finally, the robot and another robot transition from current state to next state. (634)

In one embodiment, the plan execution engine allows a user to select a synchronization between different transitions to be either a strong synchronization or a weak synchronization. When a strong synchronization is selected then the autonomous robots transit from their current state to the next state only after the synchronization condition, i.e., different transition conditions, are satisfied. The strong synchronization is executed based on the process discussed in FIG. 6.

In case of a weak synchronization, a synchronized transition is executed sequentially. Sequential execution includes a robot or group of autonomous robots in a particular state transitioning to next state when a transition condition included in the synchronized transition is satisfied. After the robot transits to the next state it sends a transition message to another robot or autonomous robots awaiting the transition message. After receiving the transition message, another robot or autonomous robots satisfying the transition condition included in the synchronized transition transits to the next stage. In a weak synchronization only one message is required to execute a synchronized transition.

Figure 7:
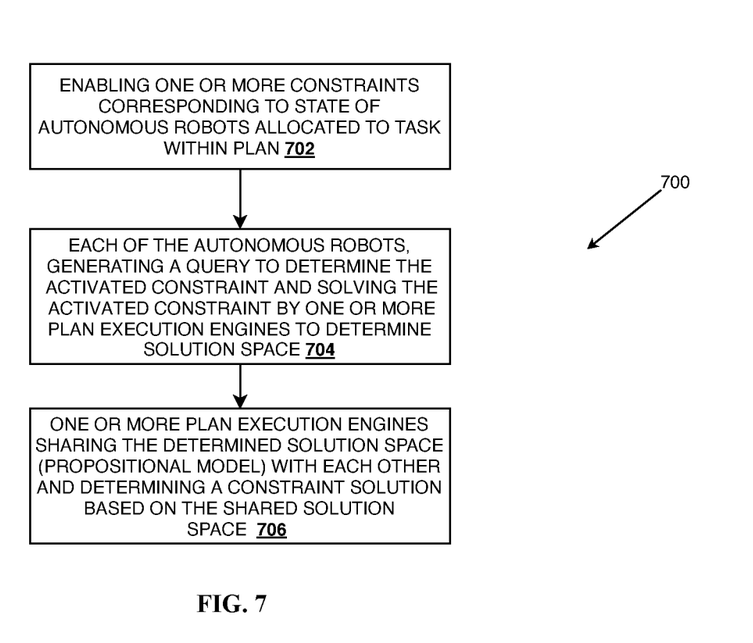
FIG. 7 is a block diagram illustrating a process to determine a constraint solution, according to an embodiment.

FIG. 7 is a block diagram 700 illustrating a process to determine a constraint solution, according to an embodiment. In one embodiment, a constraint is a particular problem that needs to be solved before or during the execution of a plan or a task by the autonomous robots. For example, consider a transportation task in a warehouse. There may be several constraints related to this task, for example, the transportation should be performed only between a picking point to a delivery point, no two autonomous robots should come within 0.5-meter proximity during the transportation task, etc.

Initially, one or more constraints corresponding to state of the autonomous robots allocated to a task within a plan are enabled (702). As discussed above, the one or more constraints defined by the user during modelling the plan are stored in a constraint store. As discussed above, when a task is to be executed then the corresponding constraint in the constraint store is activated. The activated constraint is to be solved before the agents assigned to the task can execute the task. In one embodiment, the constraints are solved collaboratively by the plan execution engine executing at the autonomous robots for a decentralized controlled plan and by the plan execution engines executing at the cloud node and the autonomous robots for a centralized controlled plan.

In one embodiment, a constraint problem is represented by an equation including a set of variables on which the constraint is applied. Solving the constraint problem includes determining values corresponding to the set of variables. For example, a constraint problem may be that a robot is within a particular area. In this case, the robot's location parameter that represents the robot's position meeting the constraint requirement is the variable for the constraint problem.

In one embodiment, solving the constraint problem is a non-deterministic polynomial-time hard problem (NP-hard problem). In order to solve the constraint problem, initially a request is received to determine a solution for a constraint problem. In one embodiment, the constraint problem in robotics is a continuous non-linear constraint. Further, in a real-world scenario conditions change in real time and the constraint solutions need to be determined at the shortest possible time. In order to determine the solution, each of the autonomous robots generates a query to determine the activated constraints that are then solved by one or more plan execution engines (704). In one embodiment, query generators at the autonomous robots generates a query to identify the one or more activated queries. The activated one or more queries are then send to plan execution engines at the autonomous robots and the cloud node (in case of a centralized controlled plan). The one or more plan execution engines independently determine a solution space corresponding to the constraint problem. In one embodiment, the solution space is a propositional model including a set of proposed values for the variables in the constraint that satisfies the constraint. The plan execution model invokes a solver included in the plan execution engine to determine the solution space. In one embodiment, the solver is a Satisfiability Modulo Theory (SMT) solver that combines a theory specific solver with a solver for Boolean Satisfiability (SAT). In case of centralized controlled plan, the one or more plan execution engines at the cloud node and the autonomous robots determine the solution space for the constraint problem. In case of de-centralized controlled plan, the one or more plan execution engines at the autonomous robots determine the solution space for the constraint problem.

Next the one or more plan execution engines share the determined solution space (propositional model) with each other and determine a constraint solution based on the shared solution space (706). Based on the determined solution space (propositional model) and the received solution spaces (propositional models) a local search is executed by the plan execution engine to determine solution for the constraint problem. In one embodiment, the local search is executed in both the centralized and decentralized controlled plan is executed only at plan execution engines at the autonomous robots. A local search is a heuristic method for solving computationally hard optimization problems. Local search can be used on problems that can be formulated as finding a solution maximizing a criterion among a number of candidate solutions. Local search algorithms move from solution to solution in the space of candidate solutions (the search space) by applying local changes, until a solution deemed optimal is found or a time bound is elapsed.

In one embodiment, a local search is restarted exactly one time. In case a solution is not found, the SMT solver is executed to produce the next propositional model, and the process is repeated. In case all propositional models are tried, both solvers that determine the solution space and execute the local search are reset and the process starts from the beginning. Finally based on the determined constraint solution, the allocated autonomous robots execute the task.

Although the embodiments herein are described with various specific embodiments, it will be obvious for a person skilled in the art to practice the embodiments herein with modifications.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims. Specifically, the steps explained in the different flow diagrams may be performed in any order and all such modifications are within the scope of the application.

The scope of the embodiments will be ascertained by the claims to be submitted at the time of filing a complete specification.

What is claimed is:

1. A computer implemented method to control execution of a centralized controlled plan and a decentralized controlled plan, the method comprising:
   a plan execution engine executing at a cloud node, receiving sensor data captured by one or more sensors at a plurality of autonomous robots and a plan execution status of the centralized controlled plan from a plurality of plan execution engines executing at a processor of the plurality of autonomous robots;

the plan execution engine executing at the cloud node, determining from the received plan execution status and the captured sensor data whether the plurality of autonomous robots satisfy a transition condition for transitioning the plurality of autonomous robots from a current state to a next state;

based on the determination, the plan execution engine executing at the cloud node, determining one or more activated constraints and task allocation for one or more autonomous robots from the plurality of autonomous robots in the next state, wherein determining one or more activated constraints and task allocation includes:

selecting utility functions for allocating tasks to at least one or more autonomous robots, wherein the utility functions include weighted sum of tasks;

allocating role to at least one or more autonomous robots based on autonomous robot capabilities;

allocating one or more tasks to at least one or more autonomous robots based on role, utility functions, and task execution capabilities;

the plan execution engine executing at the cloud node and one or more plan execution engines executing at a processor of the one or more autonomous robots collaboratively determining a constraint solution for the activated one or more plan constraints; and based on the determined constraint solution, the one or more plan execution engines executing at the one or more autonomous robots sending instructions to an actuator for executing the task included in the centralized controlled plan.

2. The computer implemented method according to claim 1, further comprising:

the plan execution engine at the cloud node sending a state change message to the plurality of plan execution engines executing at the processor of the plurality of autonomous robots to terminate execution of the task in the current state.

3. The computer implemented method according to claim 2, further comprising:

the plan execution engine executing at the cloud node, determining whether the transition condition is included in a synchronized transition condition;

determining whether another transition condition included in the synchronized transition condition is satisfied based on an execution result received from another autonomous robot; and based on the satisfied transition condition, the plan execution engine at the cloud node sending the state change message to the plurality of plan execution engines executing at the processor of the plurality of autonomous robots and a plan execution engine executing at a processor of the another autonomous robot.

4. The computer implemented method according to claim 1, wherein determining the allocation of the task to the one or more autonomous robots include:

mapping required capability of the task with the capability of the one or more autonomous robots; and based on the mapping and environment of the one or more autonomous robots, determining the allocation of the task to the one or more autonomous robots.

5. The computer implemented method according to claim 1, wherein solving the identified plan constraints to determine the constraint solution includes:

the one or more plan execution engines executing at the one or more autonomous robots and the plan execution engine executing at the cloud node solving the identified plan constraints independently to determine a constraint solution space;

the one or more plan execution engines and the plan execution engine sharing the determined constraint solution space with each other; and based on the determined and shared constraint solution space, a plan execution engine from the one or more plan execution engines conducting a local search to determine a constraint solution within the constraint solution space.

6. The computer implemented method according to claim 1, further comprising:

the plurality of plan execution engines executing at the processor of the plurality of autonomous robots individually determining from one or more of the plan execution status and the captured sensor data whether the plurality of autonomous robots satisfy a transition condition for transitioning the plurality of autonomous robots from a current state of a decentralized plan to a next state of the decentralized plan;

based on the identification, the plurality of plan execution engines executing at the processor of the autonomous robots determining activated one or more plan constraints in the next state and allocation of a task in the next state of the decentralized controlled plan to one or more autonomous robots from the plurality of autonomous robots;

the one or more plan execution engines executing at the processor included in the one or more autonomous robots collaboratively determining a constraint solution for the activated one or more plan constraints; and based on the determined constraint solution, the one or more plan execution engines executing at the one or more autonomous robots sending instructions to the actuator at the one or more autonomous robots for executing the task included in the centralized controlled plan.

7. A system to execute centralized and decentralized controlled plans by a plurality of autonomous robots, the method system comprising:

one or more autonomous robots;

a plurality of cloud nodes in communication with the one or more autonomous robots;

a plurality of plan execution engines executing at the one or more autonomous robots, and a plurality of plan execution engines executing at the plurality of cloud nodes, wherein one or more plan execution engine from the plurality of plan execution engines executing at the cloud nodes include:

a task allocation processor to determine allocation of the task in the centralized controlled plan to the one or more autonomous robots, wherein the allocation of the task in the centralized controlled plan to the one or more autonomous robots includes:

selecting utility functions for allocating tasks to at least one or more autonomous robots, wherein the utility functions include weighted sum of tasks;

allocating role to at least one or more autonomous robots based on autonomous robot capabilities;

allocating one or more tasks to at least one or more autonomous robots based on role, utility functions, and task execution capabilities;

and wherein one or more plan execution engine from the plurality of plan execution engines executing at the robot includes:
- a solver processor executing in collaboration with the processor included in the one or more plan execution engines executing at the cloud node to collaboratively determine a constraint solution for the identified plan constraints; and
- the solver processor sending instructions to the one or more autonomous robots to execute the allocated plurality of tasks included in the centralized controlled plan by the one or more autonomous robots based on the determined constraint solution.

8. The system of claim 7, wherein the system further comprises:
- a memory to store the centralized and decentralized control plan data; and the plurality of plan execution engines further comprising:
  - a parser to parse the stored centralized and decentralized control plan data to generate centralized and decentralized control plan executable.

9. A computer system to control execution of a centralized controlled plan and a decentralized controlled plan collaboratively by a plurality of autonomous robots, the system comprising:
- a memory to store instructions;
- a processor to execute the instructions comprising:
  - a plan execution engine executing at a cloud node, receiving sensor data captured by one or more sensors at a plurality of autonomous robots and a plan execution status of the centralized controlled plan from a plurality of plan execution engines executing at a processor of the plurality of autonomous robots;
  - the plan execution engine executing at the cloud node, determining from the received plan execution status and the captured sensor data whether the plurality of autonomous robots satisfy a transition condition for transitioning the plurality of autonomous robots from a current state to a next state;
  - based on the determination, the plan execution engine executing at the cloud node, determining one or more activated constraints and task allocation for one or more autonomous robots from the plurality of autonomous robots in the next state, wherein determining one or more activated constraints and task allocation includes:
    - selecting utility functions for allocating tasks to at least one or more autonomous robots, wherein the utility functions include weighted sum of tasks;
    - allocating role to at least one or more autonomous robots based on autonomous robot capabilities;
    - allocating one or more tasks to at least one or more autonomous robots based on role, utility functions, and task execution capabilities;
  - the plan execution engine executing at the cloud node and one or more plan execution engines executing at a processor of the one or more autonomous robots collaboratively determining a constraint solution for the activated one or more plan constraints; and
  - based on the determined constraint solution, the one or more plan execution engines executing at the one or more autonomous robots sending instructions to an actuator for executing the task included in the centralized controlled plan.

10. The computer system of claim 9, further comprising:
the plan execution engine at the cloud node sending a state change message to the plurality of plan execution engines executing at the processor of the plurality of autonomous robots to terminate execution of the task in the current state.

11. The computer system of claim 10, further comprising:
- the plan execution engine executing at the cloud node, determining whether the transition condition is included in a synchronized transition condition;
- determining whether another transition condition included in the synchronized transition condition is satisfied based on an execution result received from another autonomous robot; and
- based on the satisfied transition condition, the plan execution engine at the cloud node sending the state change message to the plurality of plan execution engines executing at the processor of the plurality of autonomous robots and a plan execution engine executing at a processor of the another autonomous robot.

12. The computer system of claim 10, further comprising:
- the plan execution engine at the cloud node, identify whether the transition condition is included in a synchronized transition condition;
- determine whether another transition condition included in the synchronized transition condition is satisfied based on an execution result received from another autonomous robot; and
- based on the satisfied transition condition, the plan execution engine at the cloud node send a terminating execution of the task by the one or more autonomous robots and another task by the another autonomous robot.

13. The computer system of claim 9, further comprising:
- mapping required capability of the task with the capability of the one or more autonomous robots; and
- based on the mapping and environment of the one or more autonomous robots, determining the allocation of the task to the one or more autonomous robots.

14. The computer system of claim 9, further comprising:
- the one or more plan execution engines executing at the one or more autonomous robots and the plan execution engine executing at the cloud node solving the identified plan constraints independently to determine a constraint solution space;
- the one or more plan execution engines and the plan execution engine sharing the determined constraint solution space with each other; and
- based on the determined and shared constraint solution space, a plan execution engine from the one or more plan execution engines conducting a local search to determine a constraint solution within the constraint solution space.

15. A non-transitory computer-readable storage medium having instructions stored thereon, which when executed by a computer, cause the computer to:
- a plan execution engine executing at a cloud node, receiving sensor data captured by one or more sensors at a plurality of autonomous robots and a plan execution status of the centralized controlled plan from a plurality of plan execution engines executing at a processor of the plurality of autonomous robots;
- the plan execution engine executing at the cloud node, determining from the received plan execution status and the captured sensor data whether the plurality of autonomous robots satisfy a transition condition for transitioning the plurality of autonomous robots from a current state to a next state;
- based on the determination the plan execution engine executing at the cloud node, determining one or more activated constraints and task allocation for one or more autonomous robots from the plurality of autonomous robots in the next state, wherein determining one or more activated constraints and task allocation includes:
  selecting utility functions for allocating tasks to at least one or more autonomous robots, wherein the utility functions include weighted sum of tasks;
  allocating role to at least one or more autonomous robots based on autonomous robot capabilities;
  allocating one or more tasks to at least one or more autonomous robots based on role, utility functions, and task execution capabilities;
  the plan execution engine executing at the cloud node and one or more plan execution engines executing at a processor of the one or more autonomous robots collaboratively determining a constraint solution for the activated one or more plan constraints; and
  based on the determined constraint solution, the one or more plan execution engines executing at the one or more autonomous robots sending instructions to an actuator for executing the task included in the centralized controlled plan.

16. The non-transitory computer-readable storage medium of claim 15 having instructions stored thereon, which when executed by the computer, further cause the computer to:
  the plan execution engine at the cloud node sending a state change message to the plurality of plan execution engines executing at the processor of the plurality of autonomous robots to terminate execution of a task in the current state.

17. The non-transitory computer-readable storage medium of claim 16 having instructions stored thereon, which when executed by the computer, further cause the computer to:
  the plan execution engine executing at the cloud node, determining whether the transition condition is included in a synchronized transition condition;
  determining whether another transition condition included in the synchronized transition condition is satisfied based on an execution result received from another autonomous robot; and
  based on the satisfied transition condition, the plan execution engine at the cloud node sending the state change message to the plurality of plan execution engines executing at the processor of the plurality of autonomous robots and a plan execution engine executing at a processor of the another autonomous robot.

18. The non-transitory computer-readable storage medium of claim 16 having instructions stored thereon, which when executed by a computer, further cause the computer to:
  identifying whether the determined transition condition is included in a synchronized transition condition;
  determining whether another transition condition included in the synchronized transition condition is satisfied based on an execution result received from another of the one or more autonomous robots; and
  based on the satisfied transition condition, terminating execution of the one or more tasks by the one or more autonomous robots.

19. The non-transitory computer-readable storage medium of claim 15 having instructions stored thereon, which when executed by a computer, further cause the computer to:
  mapping required capability of the task with the capability of the one or more autonomous robots; and
  based on the mapping and environment of the one or more autonomous robots, determining the allocation of the task to the one or more autonomous robots.

20. The non-transitory computer-readable storage medium of claim 15 having instructions stored thereon, which when executed by a computer, further cause the computer to:
  the one or more plan execution engines executing at the one or more autonomous robots and the plan execution engine execute at the cloud node solving the identified plan constraints independently to determine a constraint solution space;
  the one or more plan execution engines and the plan execution engine sharing the determined constraint solution space with each other; and
  based on the determined and shared constraint solution space, a plan execution engine from the one or more plan execution engines conducting a local search to determine a constraint solution within the constraint solution space.

* * * * *